US009129132B2

(12) United States Patent
Serrano et al.

(10) Patent No.: US 9,129,132 B2
(45) Date of Patent: Sep. 8, 2015

(54) REPORTING AND MANAGEMENT OF COMPUTER SYSTEMS AND DATA SOURCES

(75) Inventors: Miguel Saiz Serrano, Mountain View, CA (US); Terence Runge, Mountain View, CA (US)

(73) Assignee: Wal-Mart Stores, Inc., Bentonville, AR (US)

(*) Notice: Subject to any disclaimer, the term of this patent is extended or adjusted under 35 U.S.C. 154(b) by 176 days.

(21) Appl. No.: 13/479,180

(22) Filed: May 23, 2012

(65) Prior Publication Data
US 2013/0318600 A1 Nov. 28, 2013

(51) Int. Cl.
*G06F 21/00* (2013.01)
*G06F 21/62* (2013.01)
*H04L 29/06* (2006.01)
*G06F 15/173* (2006.01)

(52) U.S. Cl.
CPC ............ *G06F 21/6245* (2013.01); *G06F 21/00* (2013.01); *G06F 15/173* (2013.01); *H04L 63/1441* (2013.01); *H04L 63/20* (2013.01)

(58) Field of Classification Search
CPC ....... G06F 21/00; G06F 15/173; G06F 17/30; H04L 63/20; H04L 63/1441
USPC ..................................................... 726/22, 25
See application file for complete search history.

(56) References Cited

U.S. PATENT DOCUMENTS

| | | | |
|---|---|---|---|
| 6,064,972 A | 5/2000 | Jankowitz | |
| 6,925,443 B1 | 8/2005 | Baggett, Jr. | |
| 7,278,163 B2 | 10/2007 | Banzhof | |
| 7,281,020 B2 | 10/2007 | Fine | |
| 8,307,427 B1 | 11/2012 | Wisilosky | |
| 2007/0016955 A1* | 1/2007 | Goldberg et al. | 726/25 |
| 2008/0086345 A1* | 4/2008 | Wilson et al. | 705/7 |
| 2009/0006268 A1* | 1/2009 | Tanner | 705/36 R |
| 2012/0311454 A1 | 12/2012 | Danis | |
| 2013/0247205 A1* | 9/2013 | Schrecker et al. | 726/25 |

* cited by examiner

*Primary Examiner* — Brandon Hoffman
*Assistant Examiner* — Samuel Ambaye
(74) *Attorney, Agent, or Firm* — Bryan Cave LLP

(57) ABSTRACT

A system and method are provided for managing data, such as for example security or other business data. For the example of security data, security data is received from a plurality of assets that may or may not be remotely located. A plurality of security metrics are computed and normalized according to thresholds. Security metrics are aggregated to generate an aggregate score, this may include weighting the metrics according to metric priorities. A change effort corresponding to each metric is also received and a corresponding change effort for the aggregate score is calculated. Aggregate scores and aggregate change efforts are analyzed to generate risk reduction recommendations. Upon instruction, metrics corresponding to an aggregate score may be displayed including recommendations of metrics for risk reduction. The recommended metrics may be selected according to analysis of change-to-effort ratios for the metrics.

27 Claims, 12 Drawing Sheets

Leaderboard - Assets Sorted By Security Score

| Asset: Site | Security Score 1 - 100 | | Ranking | | Fin. | Cus. | L&G | I.Pr. | Asset Size (Bubble) | | Effort to improve |
|---|---|---|---|---|---|---|---|---|---|---|---|
| | | | Top 8 | Compliance | | | | | $ | # of Customers | |
| groceries.asda.com | △ | 96 | 8 weeks | 20 weeks | 67 | 87 | 32 | 78 | 1,300,000,000 | 6,500,000 | 24 |
| www.wal-mart.com.mx | △ | 90 | 4 weeks | 15 weeks | 67 | 87 | 32 | 78 | 1,200,000,000 | 7,890,000 | 45 |
| www.walmart.ca | △ | 82 | 2 weeks | 16 weeks | 67 | 89 | 23 | 67 | 1,000,000,000 | 5,000,000 | 32 |
| www.wal-martchina.com | ▽ | 76 | 0 weeks | 12 weeks | 78 | 45 | 67 | 76 | 1,100,000,000 | 3,800,000 | 89 |
| www.walmart.com | △ | 39 | | | 67 | 87 | 32 | 78 | 4,000,000,000 | 20,000,000 | 67 |
| www.yudu.com | △ | 39 | | | 45 | 78 | 67 | 54 | 205,000,000 | 4,000,000 | 38 |
| www.the-seivu.com | △ | 35 | | | 45 | 78 | 67 | 54 | 908,000,000 | 1,500,000 | 67 |
| www.lider.cl | △ | 34 | | | 67 | 89 | 23 | 67 | 567,000,000 | 2,200,000 | 54 |
| www.walmart.com.ar | ▽ | 10 | | | 78 | 45 | 67 | 76 | 610,000,000 | 1,850,000 | 67 |
| @WalmartLabs | ▽ | 10 | | | 78 | 45 | 67 | 76 | 156,000,000 | 2,000,000 | 98 |
| www.walmart.com.br | ▽ | 5 | | | 45 | 78 | 67 | 54 | 800,000,000 | 3,500,000 | 91 |

REPORTING AND MANAGEMENT OF COMPUTER SYSTEMS AND DATA SOURCES

RELATED U.S. APPLICATIONS DATA

This application is related to U.S. application Ser. No. 13/479,184, filed May 23, 2012 and U.S. application Ser. No. 13/479,191, filed May 23, 2012. All applications are incorporated herein by reference for all purposes.

FIELD OF THE INVENTION

This invention relates generally to the field of reporting and management as related to computer systems such as for example computer security, and, more particularly, to managing local or remote computer installations and data sources.

BACKGROUND

The ubiquity of the Internet and the abundance of bandwidth and software exploiting it have enabled truly global operation of companies. The rapid communication enabled by the Internet enables real-time monitoring and control of many aspects of a global corporation. The abundant information and instant access creates problems for executives and other decision makers that must analyze the large amount of information and take timely actions based thereon.

A primary concern for a global company is security. Assets may need to be located in geographically dispersed locations. Some locations may be open for business to a global company but still have significant security risks due to crime, unrest, and the like. The global reach of the Internet also enables targeting of every company's computing assets by hackers. The automation enabled by the Internet and readily available computing resources means that many aspects of a company involve transactions over the Internet including ecommerce transactions, customer service, employee payroll, and health benefit. It is critical that companies have processes and controls in place to maintain security of this data.

Systems and methods are disclosed herein enabling the rapid aggregation and presentation of data from various computing assets in a way that enables ready determination of how to improve security or other business metrics.

BRIEF DESCRIPTION OF THE DRAWINGS

The specific features, aspects and advantages of the present invention will become better understood with regard to the following description and accompanying drawings where:

FIG. 7B is a chart illustrating the presentation of aggregate scores and associated data in accordance with an embodiment of the present invention.

DETAILED DESCRIPTION

Figure 1:
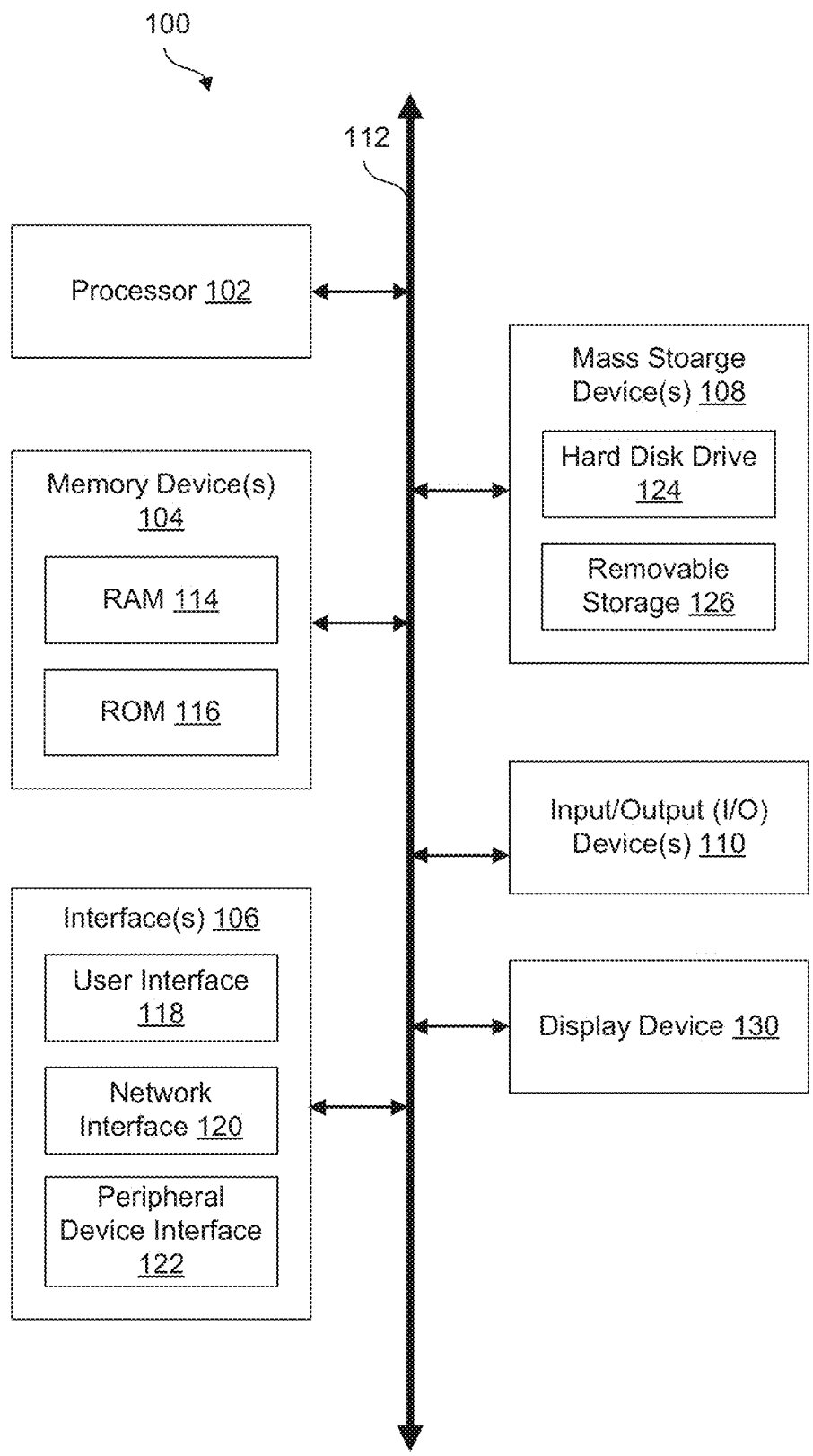
FIG. 1 is a block diagram illustrating an example computing device capable of implementing the systems and methods disclosed herein.

In the following description of the preferred embodiment of the present invention, reference is made to the accompanying drawings, which form a part hereof, and in which is shown by way of illustration specific embodiments in which the invention is may be practiced. It is understood that other embodiments may be utilized and structural changes may be made without departing from the scope of the present invention.

In the following description, numerous specific details are set forth in order to provide a thorough understanding of the present invention. However, it will be apparent to one skilled in the art that the present invention can be practiced without these specific details. In other instances, well known circuits, components, algorithms, and processes have not been shown in detail or have been illustrated in schematic or block diagram form in order not to obscure the present invention in unnecessary detail. Additionally, for the most part, details concerning networks, interfaces, computing systems, and the like have been omitted inasmuch as such details are not considered necessary to obtain a complete understanding of the present invention and are considered to be within the understanding of persons of ordinary skill in the relevant art.

It is further noted that, where feasible, all functions described herein may be performed in either hardware, software, firmware, digital components, or analog components or a combination thereof, unless indicated otherwise. Certain terms are used throughout the following description and Claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ."

Embodiments of the present invention are described herein. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with applications and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Approaches for managing remote assets may include receiving, by a global system, data such as for example security data from a plurality of assets are disclosed herein. The global system computes at least one metric such as for example a security metric for each asset according to an evaluation of the data from the asset. The global system further receives a change effort estimate corresponding to the metrics from the plurality of assts. The metric and change effort are analyzed to generate recommendations for management, such as for example for the analysis of security metrics for risk management and/or reduction. Throughout this specification, reference will be made particularly to security metric examples. These examples are intended as just that, examples, and not to limit the spirit and scope of the invention, which is defined by the appended claims, claims I other related filings, and also future claims submitted with a co-pending application.

In one example related to security metrics, at least one security metric for each asset includes a plurality of security metrics system and an aggregate score is computed for each asset according to the plurality of metrics. For example, the metrics may be normalized and averaged to compute an aggregate score. The metrics may be weighted according to a priority prior to aggregation. Each metric may have a threshold or goal value associated therewith. Normalization of a metric may therefore include normalization with respect to a corresponding threshold value.

Displaying change recommendations comprises displaying graphical representations of the aggregate scores for the assets segregated according to change effort. In some embodiments, each asset size has an asset size associated therewith and displaying graphical representations of the aggregate scores using data markers having a size corresponding to the asset size of the asset corresponding thereto. The asset size may correspond to one or both of the value of sales generated using the asset and the number of customers associated with the asset.

Upon receipt of a user instruction, information may be displayed regarding individual metrics corresponding to an aggregate score. A subset of metrics may be selected for display according to the impact of the security metrics on the selected aggregate score. For example, a ratio of each security metric to a corresponding change effort may be calculated and the ratios compared to determine ready security gains. Other related methods and corresponding apparatus are also disclosed and claimed herein.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
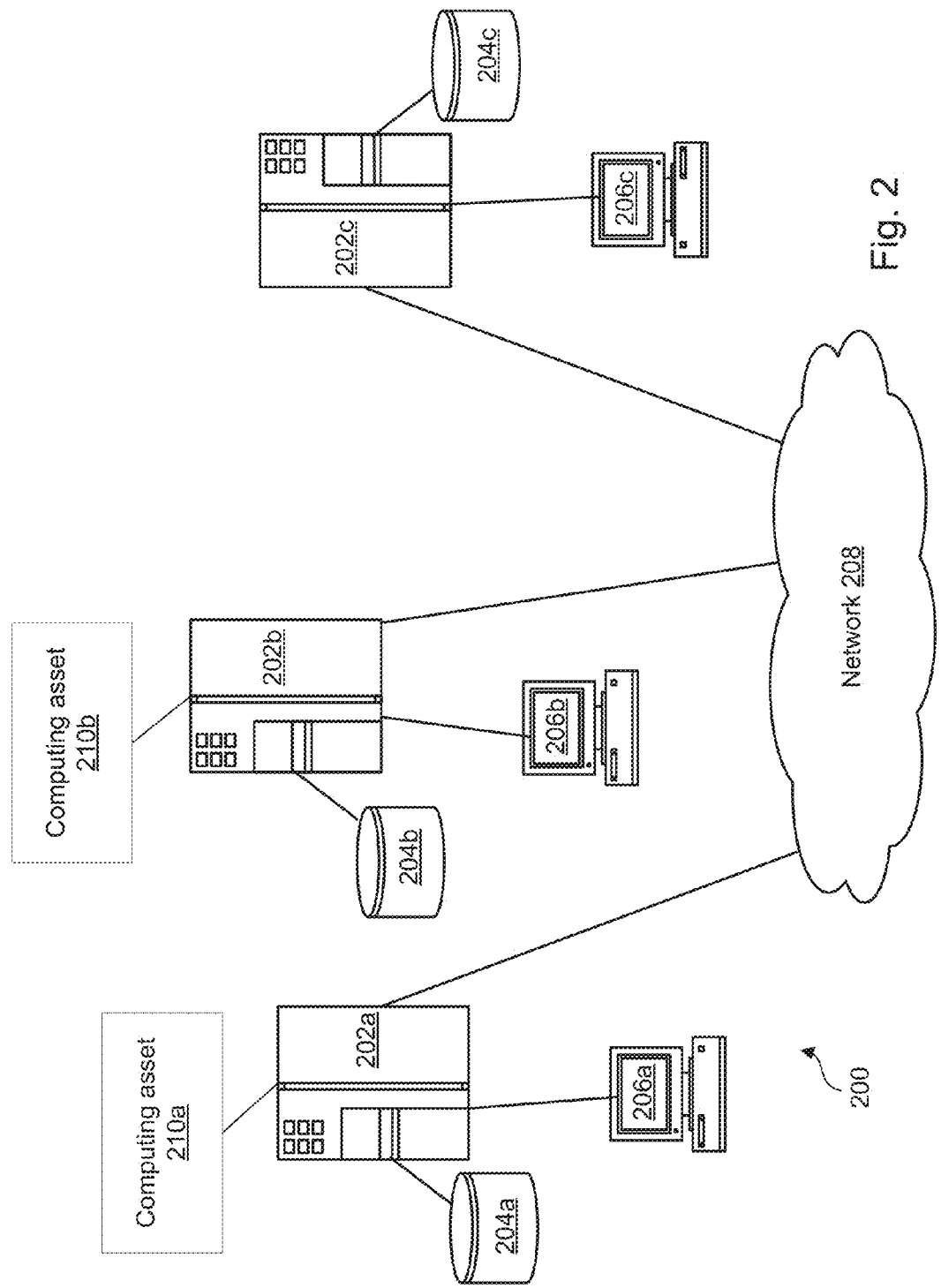
FIG. 2 is a block diagram illustrating a networked computing environment suitable for implementing the systems and method s disclosed herein.

FIG. 2 illustrates a networked environment 200 in which methods described herein may be used. The environment 200 may include a plurality of servers 202a-202c. The servers 202a-202c may be geographically separated, such as in different cities, countries, or continents. The methods disclosed herein may also advantageously be used with servers 202a-202c that are located within the same facility. The servers 202a-202c may be operably coupled to one or more databases 204a-204c for storing operational and/or executable data. A user wishing to access data and functionality of the servers 202a-202c and databases 204a-204c may do so by means of terminals 206a-206c operably coupled thereto. The terminals 206a-206c may have some or all of the attributes of the computing device 100 of FIG. 1. The terminals 206a-206c may be a workstation, tablet computer, smart phone, or any other computing device. The servers 202a-202c may be operably connected to one another by a network 208. The network 208 may include a local area network (LAN), wide area network (WAN), the Internet, or a combination of any of these.

The servers 202a-202b may be used to manage and/or monitor activity at one or more computing assets 210a-210b. The computing assets 210a-210b may include a number of servers, workstations, tablet computers, smart phones, and the like. The computing assets 210a-210b may also include electronically controlled physical systems, i.e., door locks, climate control systems, alarm systems, and the like. The physical systems of the computing assets 210a-210b may also be controlled and/or monitored by a server, such as a server 202a-202c.

A server 202c may operate as a global server 202c operable to monitor and report on security data gathered from the servers 202a-202b, operating as asset server 202a-202b, and the corresponding computing assets 210a-210b. Alternatively, the global server 202c may communicate directly with computing resources of the computing assets 210a-210b such that asset servers 202a-202b may be omitted or bypassed.

Figure 3A:
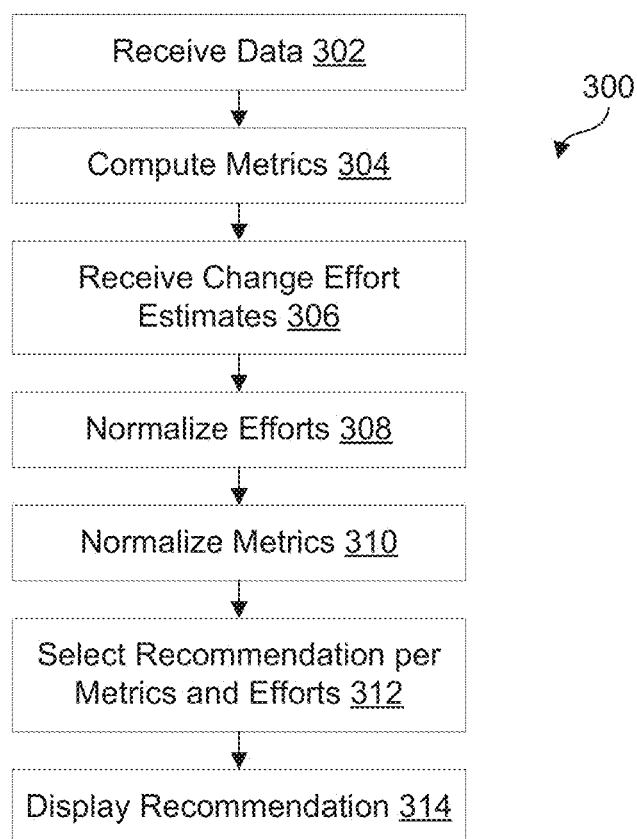
FIG. 3A is a process flow diagram of a method for aggregating security data and providing risk reduction recommendations in accordance with an embodiment of the present invention.

FIG. 3A illustrates a method 300 for monitoring and characterizing security data at one or more computing assets 210a-210b. The method 300 may be executed by the asset servers 202a-202b, by a global server 202c, or by a combination of the two types of servers. All or part of the method 300 may also be performed by computing resources of the computing assets 210a-210b.

The method 300 may include receiving 302 data, such as data or other performance data, from the computing assets 210a-210b. Receiving 302 the security data may include conducting actual tests of computing resources, reading logs of self tests, and the like. The data mined may be manually input and self-reported data generated by personnel with access to the computing assets 210a-210b. Security data may include software development security data, such as the occurrence of quality assurance checks and design reviews, logging and criticality of defects (for example number of critical, high, medium, and low defects per KLOC), and other reporting of security and quality programs. Security data may also include the verification of the installation and functionality of security measures such as anti-virus software, firewalls, and the like. Security data may also include logging of security activities by users, such as changing of passwords, the occurrence of prohibited activities such as installing non-approved software, and the like. Other examples of security data include the percentage of systems reachable by the internal and external vulnerability scans tools, conformance of users systems (eg. Workstations) to an organization's standardized operating system build image (e.g, patch and extent of anti-virus/anti-spyware controls), percentage of new initiatives undergoing a security review, percentage of site critical systems with a tested BCP/DRP, percentage of contracts with security clauses included, number of phony sites detected, number of accounts with an abnormal number of login attempts, percentage of spam email detected, number of security incidents reported, percentage of compliance with applicable regulation frameworks and standards, percentage of participation in mandatory security training sessions, percentage of compliance with account management requirements, percentage of compliance with logging requirements, percentage of data compliance with data governance standards. Other like data may also be used.

Other business data may be aggregated and reported using the methods disclosed herein. Examples of such data include, without limitation: sales, sales revenue, total sales, sessions, conversion, orders, shopping cart average value on web site, number of customers, number of current customers in data base, total number of systems (workstations), total number of associates, total number of staff in Infosec, total number of systems (front end+back end), total number of systems (total number of IP addresses exposed externally), total number of third parties, total number of new initiatives (projects), total number of emails, number of ACLs (Access Control Lists) in Firewall rulesets, number of users with VPN (Virtual Private Network) granted access, number of sites visited by users, number of systems and applications (internal and external), number of records containing private information, number of fraudulent transactions (confirmed and suspicious), number of users contacting customer support for access request related issues, customer satisfaction metrics and other security and non-security related metrics.

One or more metrics may be computed 304 based on the security data for each computing asset 210a-210b. The metrics may be a single number characterizing data such as a raw number, percentage, or the like. Change effort estimates may also be received 306 for some or all of the metrics. The change effort estimate reflects the resources required to change the metric. The change effort may be measured in currency, person-hours, or in some other denomination. The change effort may be the effort required to bring the metric to a threshold.

The change effort estimate may be received 306 from one or more of the computing assets 210a-210b, an asset server 202a-202b, a user terminal 206a-206b associated with a computing asset 210a-210b, or the like. The change effort estimates received 306 may be manually input data based on the judgment of an individual. Alternatively, the change effort estimates may be generated according to an algorithm automatically based on the metrics and any other relevant data. In yet another alternative, the change effort estimates may be generated according to both parameters input according to human judgment and an algorithm for processing those parameters, the metric, and any other relevant data.

In some embodiments, the metrics may be normalized 308 and the change efforts may be normalized 310. Normalizing 310 the change effort may include converting the units of the change effort into a standard unit. For example, a change effort denominated in dollars may be converted to person-hours or vice-versa. For example, a currency value may be converted to a person-hour by multiplying by a conversion factor. Likewise, a person-hour value may be converted to a currency value by multiplying by a conversion factor.

A recommendation may be selected 312 according to the metrics and change efforts and the recommendation may be displayed 314. Where the metrics are metrics of security data, the metric indicates a level of risk. Accordingly, the recommendation may indicate actions that can be taken to reduce the most risk with the least amount of change effort. The recommendation may be a selection of a metric having a corresponding change effort estimate such that a large reduction in risk, as measured by the metric, may be accomplished with relatively low effort, as measured by the change effort estimate.

Figure 3B:
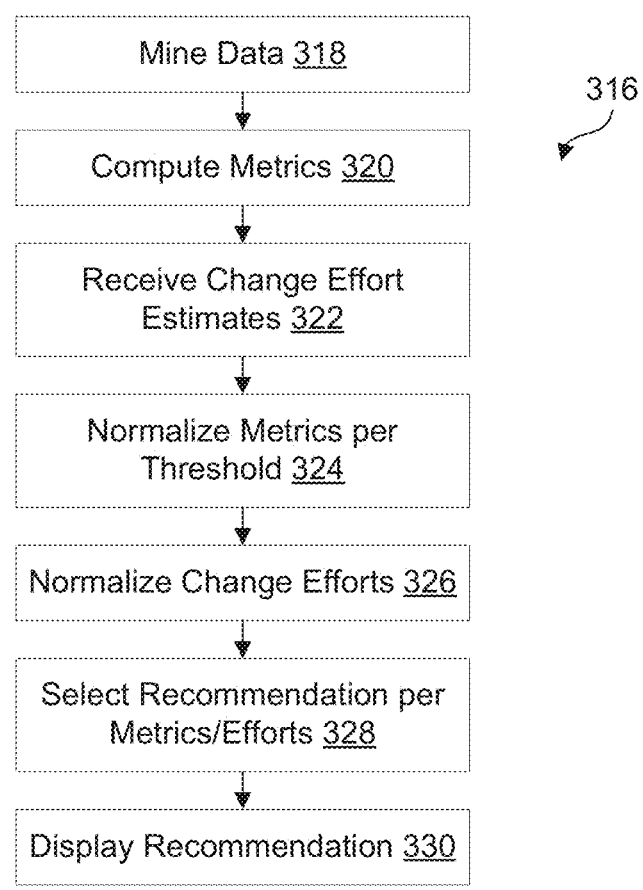
FIG. 3B is a process flow diagram of an alternative method for aggregating security data and providing risk reduction recommendations in accordance with an embodiment of the present invention.

FIG. 3B illustrates an alternative method 316 for monitoring and reporting security data from one or more computing assets 210a-210b. The method 316 may include mining 318 data from the one or more computing assets 210a-210b. Mining 318 may include any methods known in the art from retrieving information from a database, such as a remote database. Mining 316 may include analyzing data stored in forms other than a database, such as a file system, configuration files, log files, and any other data that may be stored and used by a computing asset 210a-210b.

A metric may then be computed 320 based on the mined data. The metric may be any of the metrics mentioned hereinabove, including the security metrics mentioned above. Change effort estimates may also be received 322. The change effort estimate may have some or all of the attributes of the change effort estimates as described above with respect to the method 300. The metrics may be normalized 324 according to a threshold and the change effort estimates may also be normalized 326 as described hereinabove with respect to the method 300.

For example, the normalized metric N may be calculated according to the equation $N=(M-T)/T$, where M is the metric and T is the threshold corresponding thereto. The threshold T may be a value manually set target value for the metric. The threshold may also be based on historical values for the metric such as a mean historical value for the metric or the Nth percentile of previously measured values of the metric.

A recommendation may be selected 328 according to the normalized metrics and change effort estimates. As noted above, this may include selecting a metric having a value and corresponding change effort estimate indicating that the metric may be brought up to (or down to) a threshold value with the least amount of effort. The metric selected for the recommendation may be that metric for which the largest gains can be achieved relative to the amount of effort required. The selected metric may then be displayed 328 or otherwise reported to a user.

Figure 4A:
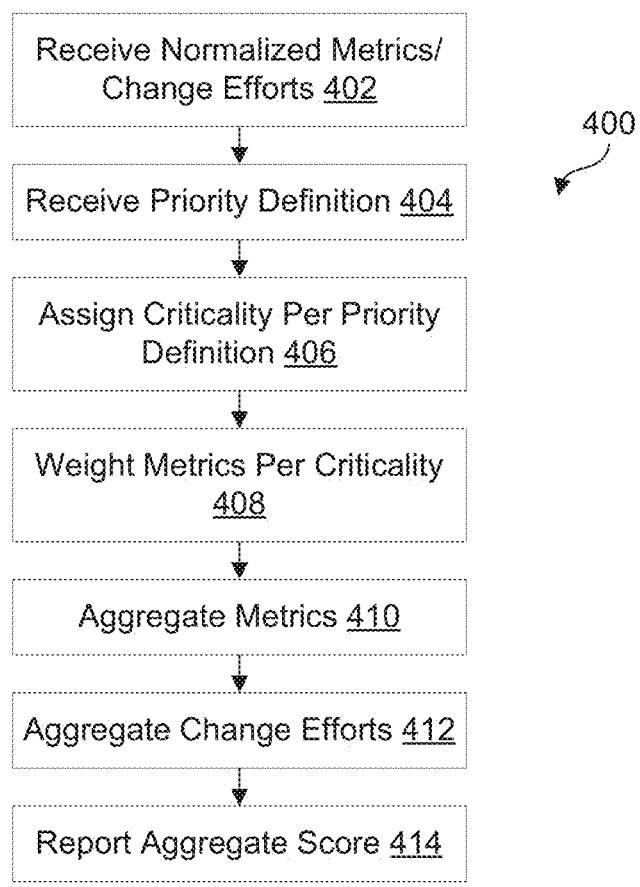
FIG. 4A is a process flow diagram of a method for generating an aggregate score in accordance with an embodiment of the present invention.

FIG. 4A illustrates a method 400 for calculating an aggregate score based on a plurality of metrics for an asset. The metrics used to calculate an aggregate score may be those corresponding to an individual computing asset 210a-210b, or that are otherwise logically related. The method 400 may be executed by one or more of an asset server 202a-202b, global server 202c, or other computing device with access to a databases 204a-204c storing the relevant data.

The method 400 may include receiving 402 normalized metrics and corresponding change effort estimates for each asset. The metrics and change efforts may be normalized as described hereinabove. This may include normalizing the metrics according to a corresponding threshold as described hereinabove. Priority definitions for the various metrics may also be received 404. Priority definitions may include ranking the metrics from high to low priority. Priorities may be assigned according to human judgment or based on evaluation of the metric and/or its underlying data.

A criticality may then be assigned 406 to each metric according to the received priority. In one embodiment, assigning 406 a criticality may include assigning a first weight to the top N metrics according to the assigned priorities, a second weight to the bottom M metrics, and a third weight to the remaining metrics. For example, the top three priority metrics may be assigned a weight of three, the bottom three priority metrics may be assigned a weight of one, and the remaining metrics may be assigned a weight of two.

The metrics may then be weighted 408 according to the assigned 406 weights. This may include multiplying the metrics by their corresponding weights. The weighted metrics may then be aggregated 410. This may include averaging the weighted metrics or otherwise computing a mean, median, geometric mean, standard deviation, or any other characterization of the weighted metrics. The change effort estimates for each metric may also be aggregated 412. This may include summing or otherwise combining the change effort estimates for each metric corresponding to an asset.

Figure 4B:
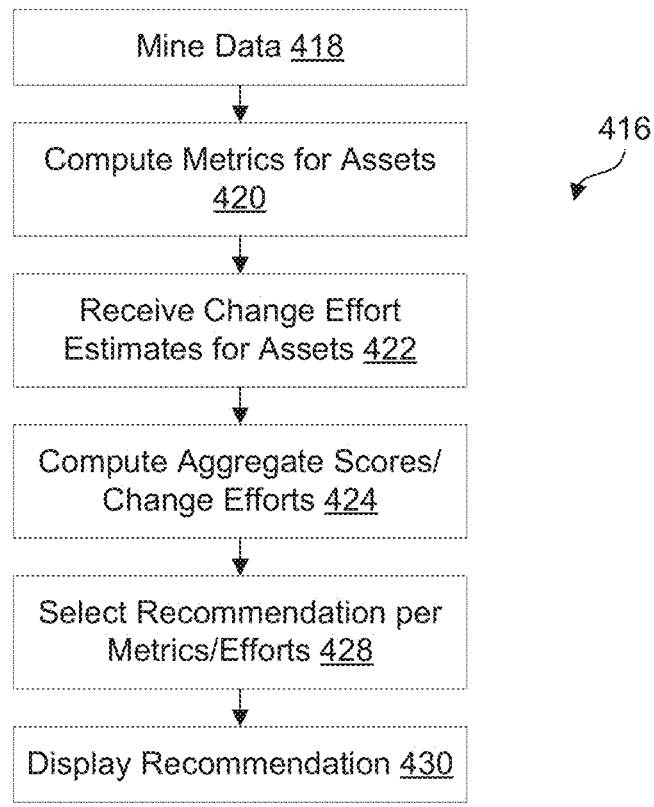
FIG. 4B is a process flow diagram of a method for generating recommendations in accordance to aggregate scores in accordance with an embodiment of the present invention.

The aggregate scores may then be reported 414 or otherwise processed. The aggregate scores may be the subject of the method 416 of FIG. 4B. The method 416 may be executed by one or more of an asset server 202a-202b, global server 202c, or other computing device with access to a databases 204a-204c storing the relevant data.

The method 416 may include mining 418 security data from the various computing assets 210a-210b and a plurality of metrics for each asset may be computed 420. This may include normalizing the metrics, such as normalizing the metrics with respect to a threshold as described above with respect to FIG. 3B Change effort estimates may also be received 422 for each metric of each asset. Aggregate scores and aggregate change efforts may be computed 424, such as using the method 400 of FIG. 4A. The aggregate scores and aggregate change effort estimates may then be evaluated in order to select 428 recommendations for reducing risk. The recommendation may include selection of one or more assets having aggregate scores and aggregate change effort estimates indicating that the greatest reduction in risk (or improvement of some other business metric) may be achieved for a given amount of change effort. The recommendations may then be displayed 430 or otherwise processed.

Figure 5:
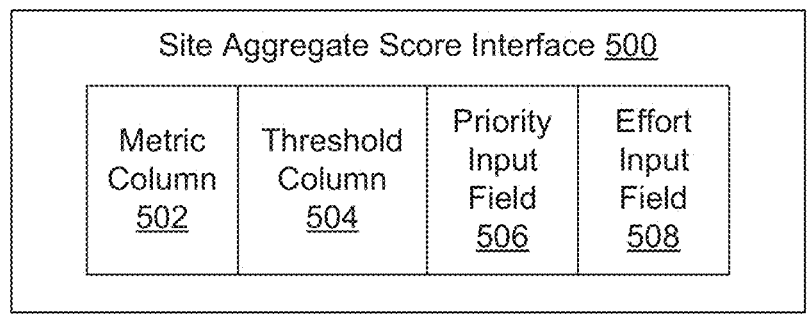
FIG. 5 is a schematic diagram of an interface for inputting aggregate score data in accordance with an embodiment of the present invention.

FIG. 5 illustrates an example interface 500 for inputting parameters for calculating an aggregate score. The interface 500 may be displayed, for example, on a terminal 206a-206b associated with a computing asset 210a-210b, a terminal 206c associated with a global server 202c, or some other computing device. The interface 500 may include a metric column 502 displaying values for various metrics. The metric column 502 may display a title, name, or other descriptor as well as its current value. A threshold column 504 may list a threshold value for the metric. The threshold may be based on historical values of the metric, as described above. The threshold may also be a goal proscribed by management, an industry standard, or some other source.

The interface 500 may additionally include fields 506, 508 for inputting one or both of a priority for each metric and the effort required to bring the metric to above a minimum threshold or below a maximum threshold. As already noted, the effort may be specified in terms of currency, person-hours, or the like. As also already noted, the effort for a metric may be calculated according to one or both of one or more parameters input according to human judgment or an algorithm based on the parameters, the metric, and any other relevant data.

Figure 6:
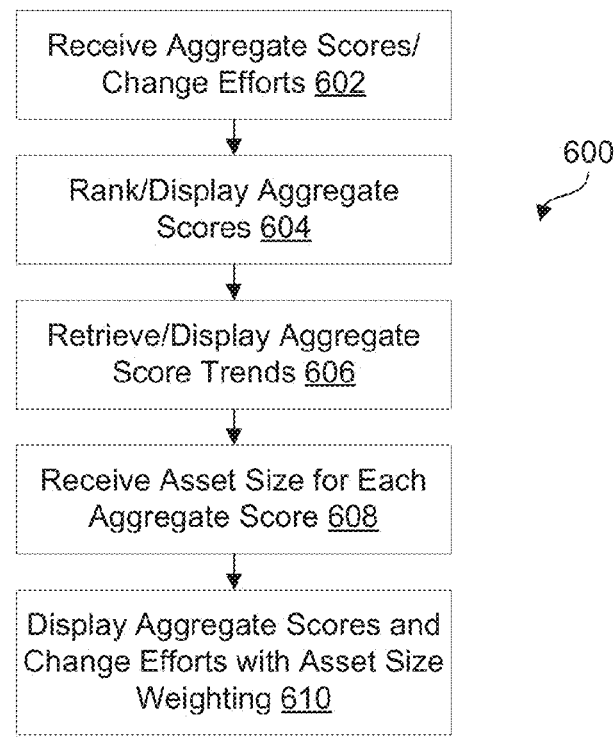
FIG. 6 is a process flow diagram of a method for displaying aggregate scores for multiple assets in accordance with an embodiment of the present invention.

FIG. 6 illustrates a method 600 for reporting aggregate scores in a manner that allows ready determination of where action can be most effectively taken to reduce risk or otherwise improve a key metric. The method 600 includes receiving 602 aggregate scores and change efforts, such as aggregate scores calculated as described hereinabove.

The aggregate scores may be ranked and displayed 604. The aggregate scores may each correspond to multiple metrics from a specific asset. Each asset may itself represent computing facilities or other resources corresponding to a particular geographic region. Accordingly, ranking of the aggregate scores enables comparison of performance and gamification of the aggregate scores, promoting competition to obtain good performance. In addition to current values of aggregate scores, previous values of the aggregate scores for an asset may be retrieved and displayed 606. This may facilitate the observation of trends for a particular asset.

In some embodiments, the method 600 may include receiving 608 an asset size for assets corresponding to the aggregate scores. The asset size may reflect the value of actual tangible property associated with an asset. In some embodiments, the asset size may reflect one or both the amount of revenue or profit associated with an asset and the number of customers associated with an asset. The aggregate scores and corresponding change efforts may be displayed 610 with weighting according to asset size.

Figure 7A:
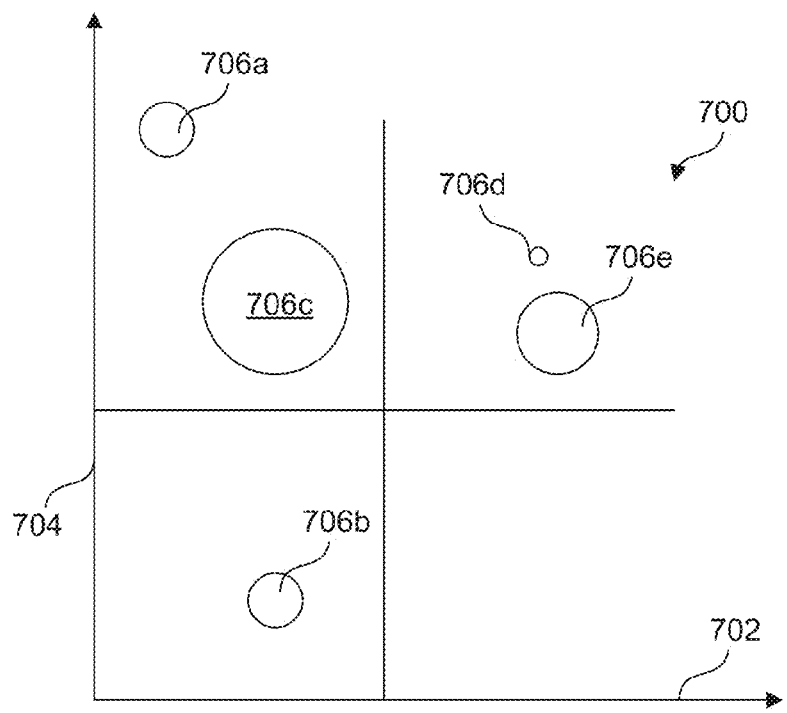
FIG. 7A is a plot of aggregate score and change effort data in accordance with an embodiment of the present invention.

For example, referring to FIG. 7A, a plot 700 may be generated having one axis 702 representing risk and another axis 704 representing the aggregate change effort estimate corresponding to the aggregate score. The data points 706a-706d may have a size corresponding to size of the asset the data point represents. In one embodiment, the size corresponds to the product of the revenue of the asset multiplied by the number of customers corresponding to the asset. Other measures of asset size may also be used, such as a value of actual property associated with the asset.

The plot 700 of FIG. 7A illustrates how the aggregate scores and aggregate change effort estimates can be used to make recommendations as to where effort should be directed to improve metrics. For example, assume the axis 702 measures increasing risk (as reflected by the aggregate scores) from left to right and axis 704 represents decreasing effort (as measured by the aggregate change effort estimates) from bottom to top. In this case, those data points in the upper right quadrant represent those aggregate scores for which the greatest reduction in risk can be accomplished for the least amount of effort. Likewise, the size of the data point indicates that size of the assets for which security can be readily improved.

FIG. 7B illustrates an example of a chart 708 presenting aggregate scores that enables ready comparison of aggregate scores for multiple assets. The chart may include, for each asset, an aggregate score name or title 710. In the illustrated embodiment, the titles represent assets corresponding to different countries; however, other asset divisions may also be used. The chart 708 may also include trend indicator 712, such as an up or down arrow indicating whether the current aggregate score is higher or lower than a prior score. The chart may also include a current aggregate score field 714 listing the current aggregate score and a trend field 716 that plots a number of immediately preceding aggregate scores for each asset.

As noted above, ranking of the assets may be used to promote competition. Accordingly, the assets in the chart 708 may be listed according to rank. In the illustrated chart, a field 718 lists the amount of time the top N (three in this case) ranked assets have been in the top N. Field 720 lists the amount of time that the top N ranked assets have been in compliance with thresholds corresponding to the metrics used to characterize each asset. A number of fields 722a-722d may be included in the chart 708 listing the values for individual metrics used to calculate the aggregate score. The values listed in the fields 722a-722d may be raw metric values or normalized metric values as described herein. An asset revenue field 724 and asset customers field 726 may list the amount of revenue and number of customers, respectively, associated with each asset. An aggregate change effort estimate field 728 lists the aggregate change effort estimate corresponding to each asset.

Figure 8:
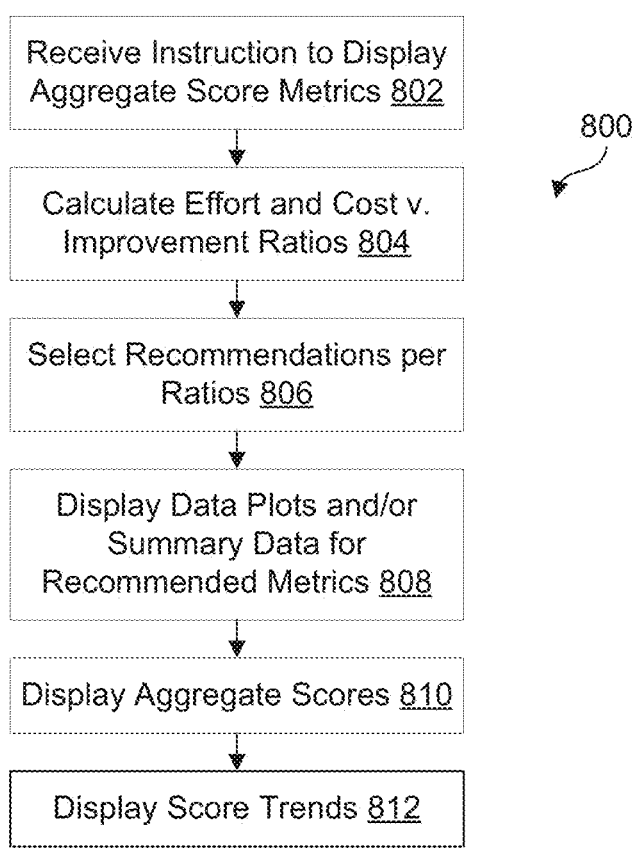
FIG. 8 is a process flow diagram of a method for displaying metric data corresponding to aggregate scores in accordance with an embodiment of the present invention.

FIG. 8 illustrates a method 800 for "drilling down" into an individual aggregate score, such as shown in the chart 708, to display more detailed information about metric and effort data contributing to the aggregate score. The method 800 may be executed by one of, or combination of one or more of, a global server 202c, a site server 202a-202b, and a terminal 206a-206c. The method 800 includes receiving 802 an instruction to display aggregate score metrics. This may include a user clicking or otherwise selecting an aggregate score from the chart 708 or a data point in the plot of FIG. 7A.

A ratio of a change effort estimate and/or cost for a metric relative to a change in that metric may be calculated 804. The change used in the calculating step 804 may be a change in the normalized metric value. The change used in the calculating step 804 may also be the change in the normalized metric value required to bring the metric up to a minimum threshold or down to a maximum threshold and the change effort may be the effort required to bring the metric down to the minimum threshold or up to the maximum threshold.

Recommendations may be selected 806 according to the ratios. For example, those metrics with lowest effort-to-change ratios may be recommended inasmuch as they represent those metrics than can be improved most significantly for a given amount of effort. Plots of the metric, summaries of metric data, and/or other metric data may be displayed 808 for the selected 806 metrics.

In some embodiments, the aggregate score associated with an asset may also be displayed 810 along with displaying 812 trend data relating to the aggregate score—such as the historic values of the aggregate score, an indicator of whether the aggregate score is trending up or down, and the like.

Figure 9:
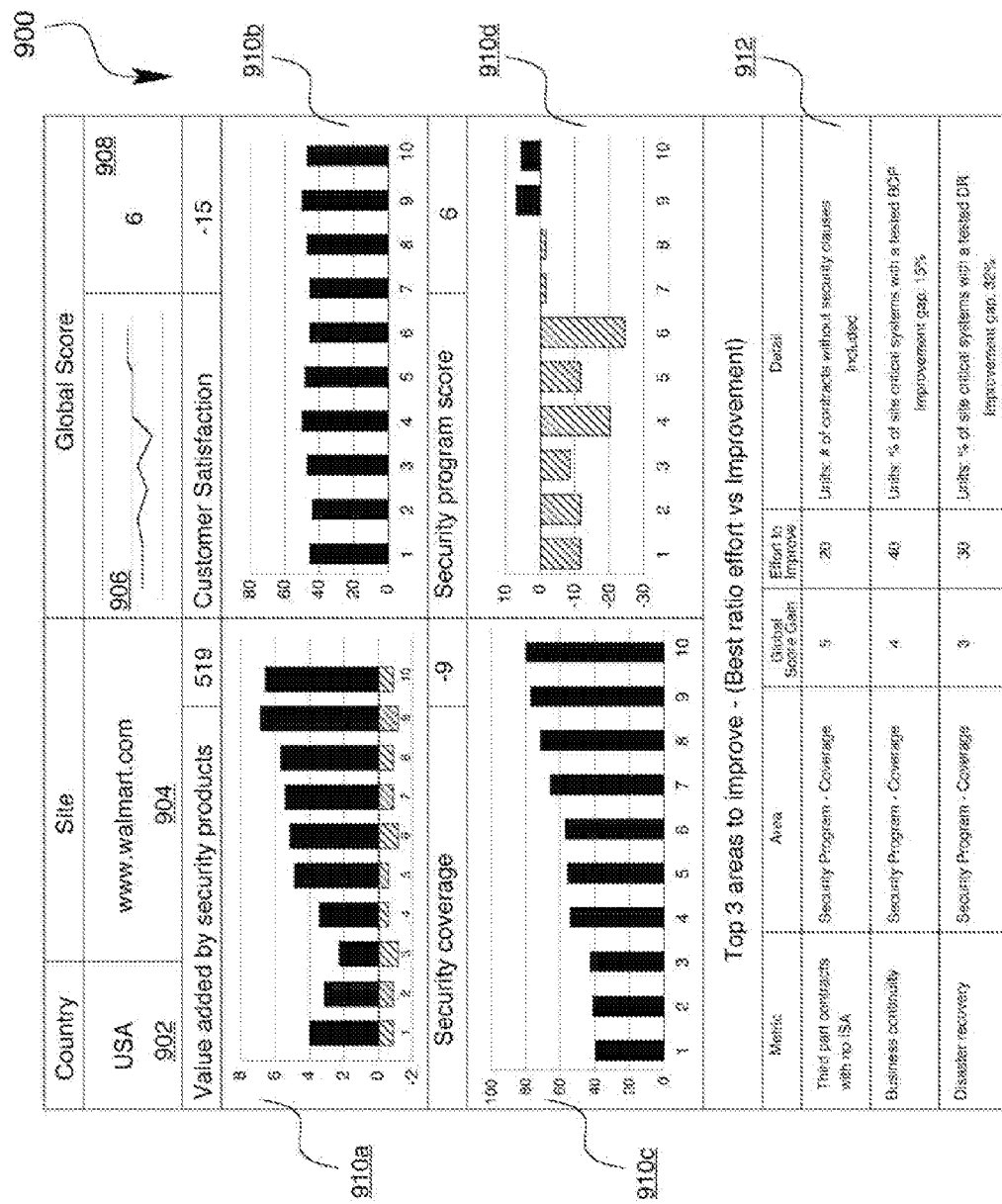
FIG. 9 is an illustration of an interface for displaying metric information corresponding to aggregate scores in accordance with an embodiment of the present invention.

FIG. 9 illustrates an example interface 900 that may be used to display information as described with respect to FIG. 8 for a particular asset that is the subject of the method 800. The interface 900 may be displayed on a terminal 206a-206c or some other computing device. The illustrated interface 900 may include an asset location field 902 specifying the geographic location of an asset and an asset identifier field 904. The interface 900 may also include a field 906 including a trend line plotting past values of the aggregate score and a field 908 listing the current value 908 of the aggregate score. A color of the current value field 908 may indicate whether the score is trending up or down, e.g., red indicates deteriorating and green indicates improving.

The interface 900 may also include one or more fields 910a-910d plotting data for recommended metrics selected as described with respect to FIG. 8. The fields 910a-910d may include plots of data underlying a metric, historical values for a metric, comparisons of the metric to thresholds, and the like. As noted above, the embodiments disclosed herein are particularly useful for managing security data. Accordingly, the fields 910a-910d may plot security related data corresponding to the recommended metrics.

The interface 900 may also include a table 912 listing the recommended metrics selected according to the method 800 of FIG. 8. The table 912 may list, for the recommended metrics information such as an identifier of the metric and a logical group to which the metric corresponds. The table 912 may also list for the recommended metrics an effect of changing the metric on a global score. For example, the table 912 may list, for each recommended metric, the amount by which the aggregate score for the asset would change if the recommended metric were brought up to a minimum threshold or down to a maximum threshold, depending on how the threshold is defined for the metric.

The table 912 may also list the change effort estimate for the metric. As noted above, the change effort estimate for a metric may be the effort required to bring the metric up to a minimum threshold or down to a maximum threshold. The table 912 may further include a brief description of the metric.

Table 1 lists an example of a report for presenting or receiving data regarding metrics, metric thresholds, priority, criticality, and change effort estimates. Table 1 may be shown in response to an instruction to list all metrics associated with an aggregate score. As shown in Table 1, metrics may be displayed with one or more of a name of the metric, a brief description of the objective of the metric, the value of the metric for a number of preceding dates (week 1, week 2, etc.), threshold for each metric, a priority assigned to each priority, a criticality for each metric, and the change effort for each metric.

A table may additionally include a row tabulating the aggregate score for each of the preceding dates listed in the table. Each of the metrics of Table 1, may be the result of an aggregation of various sub-metrics. For example, the metrics of Table 2 may be used to generate one of the metrics of Table 1, or vice versa. As for Table 1, information for sub-metric may include a name, objective, preceding values, a threshold value, and a weight for each sub-metric. The information of Table 1 may be nested within Table 2. For example, selection of an entry of Table 1 may invoke display of Table 2 populated with information regarding the selected entry.

may further include change effort data 1006. As noted above, change effort data is data input according to human judgment or calculated according to the security data 1002. The change effort data indicates the amount of effort denominated in currency and/or person hours to change a security metric. For example, the amount of effort required to bring a metric up to a minimum threshold or down to a maximum threshold.

The asset database 1002 may also include priority data 1008 for the various assets associated with an asset. As noted above, priority data 1008 may include a ranking of metrics associated with an asset. The priority data 1008 may reflect a human estimate of the importance of each metric.

The asset database 1002 may include metric data history 1010 for the metrics associated with the asset and asset size data 1012. The asset size data 1012 may indicate one or more of the number of customers associated with an asset and the amount of revenue generated by an asset. Other data characterizing the size of an asset may also be included in the asset size data 1012.

A global database 1014 may store data used by a global server 202c to perform some or all of the methods described herein. The global database 1014 may include security data 1016 mined from one or more asset databases or otherwise mined from the one or more computing assets 210a-210b. Where other data is the subject of the methods described herein, other relevant data may also be mined and stored in the global database 1014. The global database 1014 may store aggregate score histories 1018 recording current and past values of the aggregate scores for each asset. The aggregate score histories 1018 may additionally store values for the metrics corresponding to the current and past values of the aggregate scores.

The global database 1014 may further include change effort data 1020 as reported from the various assets, ranking

TABLE 1

Metric Reporting Table

| Name | Objective | wk 1 | wk 2 | wk 3 | wk 4 | Threshold | Priority | Criticality | Effort |
|------|-----------|------|------|------|------|-----------|----------|-------------|--------|
| ### | ###### | ### | ### | ### | ### | ### | ### | ### | ### |
| ### | ##### | ### | ### | ### | ### | ### | ### | ### | ### |
|     | Score | ### | ### | ### | ### | ### |     | ### | ### |

TABLE 2

Sub-Metric Reporting Table

| Name | Objective | wk 1 | wk 2 | wk 3 | wk 4 | Threshold | Weight |
|------|-----------|------|------|------|------|-----------|--------|
| ### | ###### | ### | ### | ### | ### | ### | ### % |
| ### | ##### | ### | ### | ### | ### | ### | ### % |
|     | Score | ### | ### | ### | ### | ### | ### % |

Figure 10:
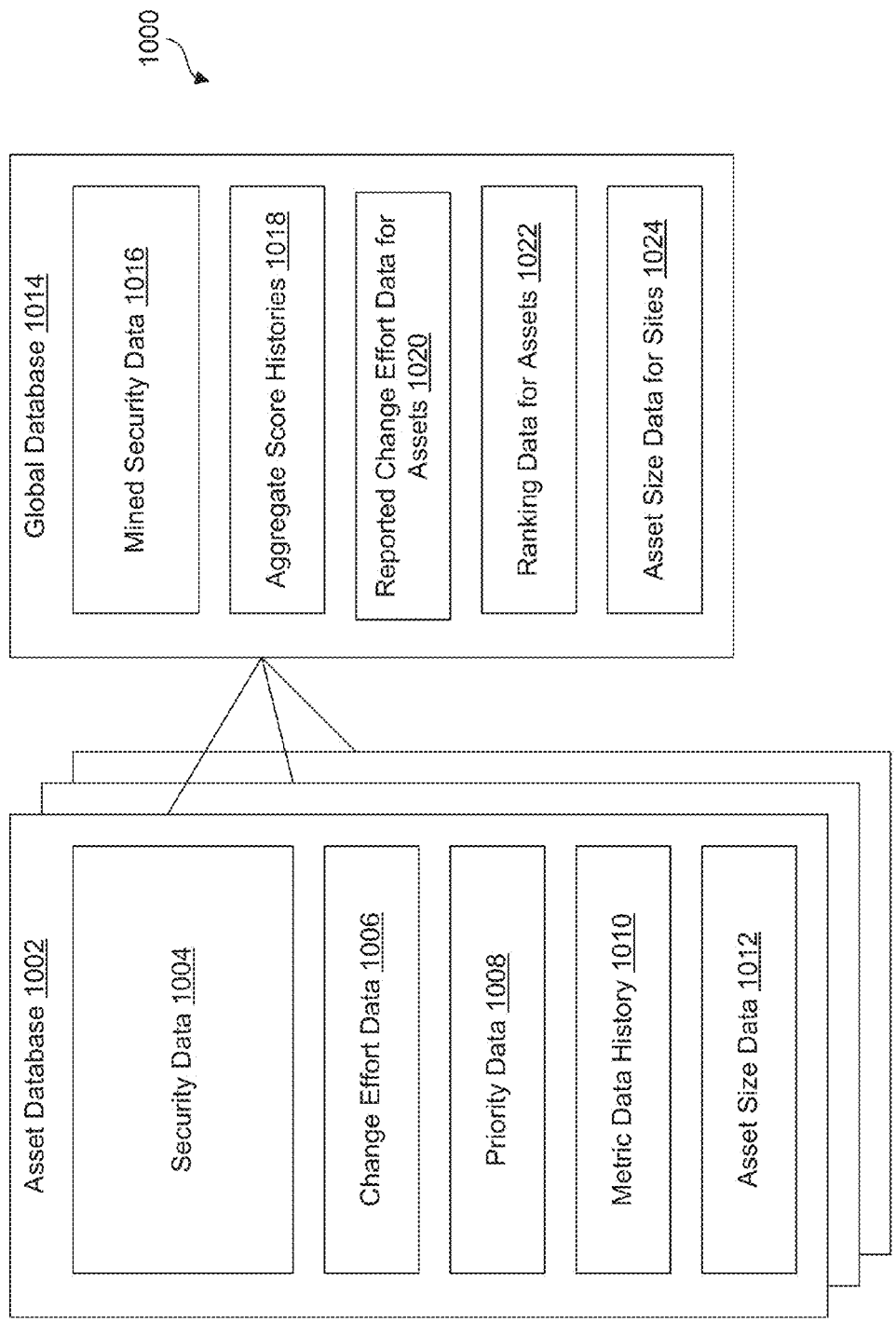
FIG. 10 is a schematic block diagram of databases for generating aggregate scores and corresponding metrics in accordance with an embodiment of the present invention.

FIG. 10 illustrates examples of data 1000 that may be used to perform the illustrated methods. For example, an asset database 1002 may be associated with an asset, such as an asset server 202a-202b. The database 1002 need not be collocated with the asset and databases 1002 for various assets may be hosted in a database maintained by a global server 202c.

Examples of data associated with an asset may include security data 1004. The security data 1004 may include any data reflecting on the risk of loss or harm to an asset or customers associated with an asset, such as the examples of security described hereinabove. Where the methods described herein are applied to other types of data, the database 1002 may include other relevant data. The data 1002 data 1022 indicating one or both of past rankings of assets relative to one another and the current ran of assets, and asset size data 1024. As noted above, asset size data may include one or both of the amount of revenue associated with an asset, the number of customers associated with a data, or other data indicating the size or value of an asset.

Figure 11:
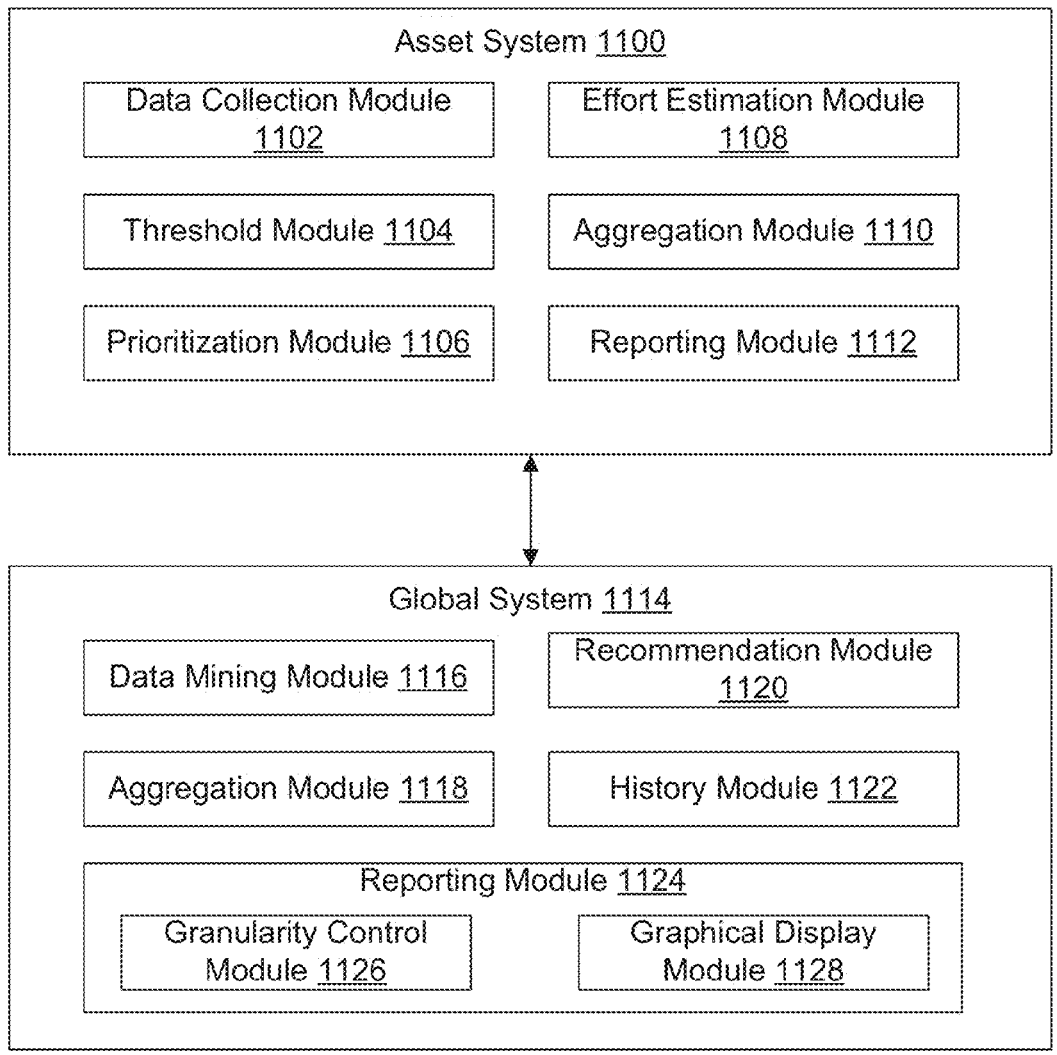
FIG. 11 is a schematic block diagram of modules implementing methods in accordance with embodiments of the present invention.

FIG. 11 illustrates an example of modules suitable for performing methods as disclosed herein. For example an asset system 1100 associated with an individual asset may include some or all of the illustrated modules. Modules as discussed herein may be embodied as software and/or hardware having the illustrated functionality. Functionality associated with a module may be performed by one or more processors or one or more computing devices. The asset system 1100 itself may be embodied by one or more processors and by one or more computing devices having memory storing operational and executable code for programming the one or more processors to perform the functionality associated with the module.

The asset system 1100 may include a data collection module 1102. The data collection module 1102 may collect security data (or other relevant data for embodiments relating to other business metrics). The data collection module 1102 may encompass the functionality of various software tools that generate data relevant to security during use. Alternatively, the data collection module 1102 may be a module dedicated to collecting security data from a computing asset 210a-210b.

The asset system 1100 may include a threshold module 1104. The threshold module 1104 calculates or receives thresholds to which metrics may be compared. The thresholds may be minimum thresholds or maximum thresholds. In some embodiments, the threshold may be automatically calculated according to historic values for the metric such as an average, median, geometric mean, or other value derived from the historic metric values. Alternatively, thresholds may be arbitrarily defined values imposed by management, regulations, industry standards, generally accepted values, or the like.

The asset system 1100 may include a prioritization module 1106. The prioritization module 1106 may prompt a user to enter a ranking or other prioritization of metrics, receive the prioritizations, and store the metrics for use in computing an aggregate score. The user providing priority data may be part of management responsible for a specific asset or part of management responsible for global management of assets associated with a company or other entity.

The asset system 1100 may include an effort estimation module 1108. The effort estimation module prompts a user to provide change effort estimates for each metric, receive the change effort estimates, and store them for later use. As for the prioritization module 1106, the user providing the change effort estimates may be part of management for an individual asset or global management for an entity. The change effort estimates may be defined as described hereinabove.

The asset system 1100 may include an aggregation module 1110. The aggregation module aggregates metrics to compute an aggregate score. The aggregate module 1110 may normalize individual metrics and combine them to form an aggregate score according to the methods described herein. In some embodiments, aggregation of metrics is performed only at the global level, such that an aggregation module 1110 is omitted from an asset system 1100.

The asset system 1100 may include a reporting module 1112. The reporting module 1112 displays, or formats for display elsewhere, information regarding the metrics and aggregate scores. For example, the reporting module 1112 may display the charts, tables, and other plots as discussed herein. The reporting module 1112 may also receive and process user instructions, such as an instruction to display more or less detailed views. For example, the reporting module 1112 may switch between any of the interfaces, tables, charts, and plots disclosed herein in response to user instructions.

A global system 1114 may include a data mining module 1116. The data mining module 1116 collects security data from the computing assets 210a-210b. The data mining module 1116 may interface with a data collection module 1102. Alternatively, the data mining module 1116 may perform functions ascribed to the data collection module 1102. Data mining of security data by the data mining module 1116 may include performing any data mining methods known in the art. The data mining module 116 may additionally retrieve for the assets one or more of change effort estimates and priority data for the metrics of each asset.

The global system 1114 may include an aggregation module 1118. The aggregation module 1118 may compute metrics according to the mined security data for each asset and calculate an aggregate score for each asset according to the methods disclosed herein. A recommendation module 1120 of the global system 1114 analyzes the aggregate scores and automatically generates recommendations as to assets for which the largest reduction in risk for a given amount of effort can be achieved. The recommendation module 1120 may generate the recommendations by generating a plot, such as the plot of FIG. 7A.

The global system 1114 may include a history module 1122. The history module 1122 may store historical values for one or more of the aggregate scores for each asset, the metrics corresponding to each aggregate score, prioritizations for each asset, and the change effort estimates for each asset.

The global system 1114 may include a reporting module 1124. The reporting module 1124 presents information to users regarding risks identified using security data and recommendations for actions that can be taken to reduce risk. In the illustrated embodiment, the reporting module 1124 includes a granularity control module 1126. The granularity control module 1126 may receive user instructions to display more or less information. For example, the granularity control module 1126 may allow a user to switch between views of aggregate scores for all assets, such as shown in FIGS. 7A and 7B, and views of information about a particular asset or a particular metric associated with an asset, such as those discussed herein. The reporting module 1124 may additional include a graphical display module 1128 may display, format for display, or transmit for display elsewhere, information regarding the aggregate scores for the assets, the metrics for each asset, recommendations for risk reduction, and any other reports, interfaces, tables, charts, and plots described herein.

As discussed herein, the invention may involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet-related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The software code may also include scripting languages such Pearl, Python, PHP, and the like. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of devices, such as laptop or desktop computers, hand held devices with processors or processing logic, and also possibly computer servers or other devices that utilize the invention, there exist different types of memory devices for storing and retrieving information while performing functions according to the invention, this is used for transitive and non-transitive storage. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state during transitive and non-transitive storage. The invention is not limited to any particular type of memory device, or any commonly used protocol for storing and retrieving information to and from these memory devices, respectively.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

Finally, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

The invention claimed is:

1. A method for remote-computing-asset-security management comprising:
    defining a plurality of assets, each asset of the plurality of assets representing computing facilities corresponding to a particular geographic region chosen to promote competition between divisions of a business to improve computing-asset-security management;
    receiving, by a global server, security data from the plurality of assets;
    generating, by the global server, an individual security metric value for each of multiple individual security metrics for each of the plurality of assets according to an evaluation of the security data;
    receiving, by the global server, change costs entailed by changes in corresponding individual security metric values for a particular asset of the plurality of assets and priority definitions, ranking, by priority, individual security metrics for the particular asset to which the priority definitions correspond;
    computing, by the global server, a change recommendation for risk reduction according to the change costs;
    computing an aggregate score for each of the plurality of assets by aggregating the corresponding individual security metric values, weighted relative to the priority definitions;
    displaying, at a terminal of the particular asset, the change recommendation with the change costs and the priority definitions of the corresponding individual security metrics of the particular asset, enabling resource allocation decisions; and
    displaying, also at the terminal, the aggregate score for each of the plurality of assets to promote competition through gamification.

2. The method of claim 1,
    wherein displaying the aggregate score for each of the plurality of assets further comprises displaying a graphical representation of the aggregate scores for the plurality of assets segregated according to the change costs.

3. The method of claim 2, wherein each of the plurality of assets has an asset size associated therewith; and
    wherein displaying the aggregate score of each asset of the plurality of assets further comprises displaying the graphical representation of the aggregate scores using data markers plotted according to the aggregate score of each of the plurality of assets and the change costs corresponding thereto, the data markers having a size corresponding to the asset size of the asset.

4. The method of claim 3, wherein the asset size corresponds to one or both of a value of sales generated using the asset and a number of customers associated with the asset.

5. The method of claim 4, wherein the asset size of each asset corresponds to a product of the value of sales and the number of customers associated with the asset.

6. The method of claim 2, further comprising:
    receiving, by the global server, a user instruction to display information relating to a selected aggregate score of the aggregate scores; and
    in response to the user instruction, displaying the change recommendation with the change costs and the priority definitions of the corresponding individual security metrics of the particular asset, enabling resource allocation decisions.

7. The method of claim 6, wherein displaying the change recommendation with the change costs and the priority definitions of the individual security metrics further comprises selecting, according to user-selected instructions, an individual security metric of the particular asset to access an additional subset of security metrics contributing to the individual security metric selected.

8. The method of claim 1, wherein computing the change recommendation further comprises selecting a security metric with a highest ratio of change in the individual security metric values to the change costs for the multiple individual security metrics.

9. The method of claim 1, further comprising normalizing the change costs.

10. The method of claim 9, further comprising, for each aggregate score, normalizing each of the multiple individual security metric values according to at least one compliance threshold.

11. The method of claim 1, further comprising:
    ranking, by the global server, the plurality of assets according to the aggregate scores corresponding to the plurality of assets; and
    displaying a listing of identifiers of the plurality of assets sorted according to the ranking.

12. The method of claim 1, wherein receiving, by the global server, the security data from the plurality of assets comprises performing data mining of the plurality of assets.

13. The method of claim 1, further comprising:
retrieving, by the global server, historic values of at least one of the individual security metrics; and
displaying a graphical representation of the historic values of the at least one of the individual security metrics.

14. A system comprising: one or more processors operable to execute operational and executable data, the one or more processors operably coupled to one another and to one or more memory devices, the one or more memory devices storing the operational and executable data operable to cause the one or more processors to:
receive security data from a plurality of assets, each asset of the plurality of assets representing computing facilities corresponding to a particular geographic region chosen to promote competition between divisions of a business to improve computing-asset-security management;
generate an individual security metric value for each of multiple individual security metrics for each of the plurality of assets according to an evaluation of the security data from the asset;
receive change costs entailed by changes in corresponding individual security metric values for a particular asset of the plurality of assets, and priority definitions, ranking, by priority, individual security metrics for the particular asset to which the priority definitions correspond;
compute an aggregate score for each of the plurality of assets by aggregating the corresponding individual security metric values, weighted relative to the priority definitions; and
display at a terminal pertaining to the particular asset, the change costs and the priority definitions of the corresponding individual security metrics of the particular asset, enabling resource allocation decisions, and the aggregate score for each of the plurality of assets to promote competition through gamification.

15. The system of claim 14, wherein the operational and executable data is further operable to cause the one or more processors to
display change recommendations by displaying graphical representations of the aggregate scores for the plurality of assets segregated according to the change costs.

16. The system of claim 15, wherein each asset of the plurality of assets has an asset size associated therewith; and
wherein the operational and executable data are further operable to cause the one or more processors to display the change recommendations by displaying the graphical representations of the aggregate scores using data markers plotted according to the aggregate score of each asset of the plurality of assets and the change costs corresponding thereto, the data markers having a size corresponding to the asset size of the asset corresponding thereto.

17. The system of claim 16, wherein the asset size corresponds to one or both of a value of sales generated using the asset and a number of customers associated with the asset.

18. The system of claim 17, wherein the asset size of each asset corresponds to a product of the value of sales and the number of customers associated with the asset.

19. The system of claim 15, wherein the operational and executable data are operable to cause the one or more processors to:
receive a user instruction to display information relating a selected aggregate score of the aggregate scores; and
in response to the user instruction, display the security metrics of the multiple individual security metrics corresponding to the selected aggregate score.

20. The system of claim 19, wherein the operational and executable data are further operable to cause the one or more processors to normalize each of the plurality of metric values according to at one compliance threshold, the change costs also being normalized.

21. The system of claim 20, wherein the operational and executable data are further operable to cause the one or more processors to compute a ratio of a change in the individual security metric values to the change costs for the multiple individual security metrics pertaining to the selected aggregate score.

22. The system claim 21, wherein the operational and executable data are further operable to cause the one or more processors to generate a change recommendation of the change recommendations with directions about how to improve a security metric value corresponding to the individual security metric with a most efficient ratio of change in the individual security metric value to the change costs for the multiple independent security metrics pertaining to the selected aggregate score.

23. The system of claim 14, wherein the operational and executable data are further operable to cause the one or more processors to assign the individual security metrics criticality values comprising different ranges for the priority definitions and to aggregate the individual security metric values pertaining to a common asset by weighting each individual security metric by a corresponding criticality value.

24. The system of claim 14, wherein the operational and executable data are operable to cause the one or more processors to:
rank the plurality of assets according to the at least one of the individual security metrics; and
display a listing of identifiers of the plurality of assets sorted according to the ranking.

25. The system of claim 14, wherein the operational and executable data are further operable to cause the one or more processors to receive the security data for the plurality of assets by performing data mining of the plurality of assets.

26. The system of claim 25, wherein the operational and executable data are further operable to cause the one or more processors to:
retrieve historic values of at least one of the individual security metrics for the particular asset of the plurality of assets; and
display a graphical representation of the historic values of at least one of the individual security metrics for the particular asset of the plurality of assets.

27. A system comprising: one or more processors operable to execute operational and executable data and process operational data, the one or more processors operably coupled to one another and to one or more memory devices, the one or more memory devices storing the operational and executable data operable to cause the one or more processors to:
receive, by a global server, security data from a plurality of assets;
organize the security data according to individual assets in the plurality of assets, a scope of each individual asset defined to include computing facilities corresponding to a particular business division to promote competition between divisions of a business to improve computing-asset-security management;
generate, for each individual asset of the plurality of assets, security metric values according to an evaluation of the security data from the asset;

receive, by the global server, change costs entailed by changes in corresponding individual security metric values and priority values for individual security metrics for individual assets;

assign the individual security metrics criticality values comprising different ranges for the priority values;

compute an aggregate score for each of the plurality of assets by aggregating the corresponding individual security metric values, weighted relative to the criticality values; and display:
  the change costs, the priority values, and the criticality values of the corresponding individual security metrics of a particular asset, enabling resource allocation decisions; and
  an aggregate score for each of the plurality of assets to promote competition through gamification.

* * * * *